US012724173B2

(12) United States Patent
Mern et al.

(10) Patent No.: US 12,724,173 B2

(45) Date of Patent: Sep. 1, 2026

(54) SYSTEMS AND METHODS FOR PROBABILISTIC GEOLOGY INVERSION WITH NEURAL GENERATIVE MODELS

(71) Applicant: Terra AI, Inc., Redwood City, CA (US)

(72) Inventors: John Michael Mern, San Jose, CA (US); Anthony Louis Corso, San Mateo, CA (US); Harrison Delecki, Stanford, CA (US)

(73) Assignee: Terra AI, Inc., Redwood City, CA (US)

( * ) Notice: Subject to any disclaimer, the term of this patent is extended or adjusted under 35 U.S.C. 154(b) by 0 days.

(21) Appl. No.: 19/394,413

(22) Filed: Nov. 19, 2025

(65) Prior Publication Data

US 2026/0153647 A1 Jun. 4, 2026

Related U.S. Application Data

(60) Provisional application No. 63/726,424, filed on Nov. 29, 2024.

(51) Int. Cl.
*G01V 20/00* (2024.01)
*G06N 3/045* (2023.01)
(Continued)

(52) U.S. Cl.
CPC ............ *G01V 20/00* (2024.01); *G06N 3/045* (2023.01); *E21B 2200/22* (2020.05);
(Continued)

(58) Field of Classification Search
None
See application file for complete search history.

(56) References Cited

U.S. PATENT DOCUMENTS 11,734,603 B2 * 8/2023 Al Madani ............ G01V 20/00 706/12
11,893,495 B2 * 2/2024 Kadayam Viswanathan ............... G06N 3/045

(Continued)

OTHER PUBLICATIONS

Geotexera Inc. "Geophysical Inversion." webpage <https://www.geotexera.com/inversion>, 2 pages, archived on Oct. 5, 2024; retrieved from Internet Archive Wayback Machine <https://web.archive.org/web/20241005060300/https:/www.geotexera.com/inversion> on Dec. 11, 2025.

(Continued)

*Primary Examiner* — Akash Saxena

(74) *Attorney, Agent, or Firm* — COOLEY LLP

(57) ABSTRACT

In an embodiment, input data (1) associated with a geological area and (2) including a plurality of types of input data is received. The input data is input into a multi-mode embedding encoder configured to generate an output (1) based on the input data, (2) representing a compressed version of the input data and (3) that is in a format compatible with a generative network. First random noise is generated. The output and the first random noise are input to the generative network to generate a first geological model. Second random noise different than the first random noise is generated. The second random noise, the output, and the first geological model is input to the generative network to generate a second geological model different than the first geological model.

20 Claims, 7 Drawing Sheets

(51) Int. Cl.
*G06N 3/0455* (2023.01)
*G06T 17/05* (2011.01)

(52) U.S. Cl.
CPC ...... *G01V 2210/614* (2013.01); *G06N 3/0455* (2023.01); *G06T 17/05* (2013.01); *G06T 2207/20081* (2013.01)

(56) References Cited

U.S. PATENT DOCUMENTS

| | | | | |
|---|---|---|---|---|
| 11,989,829 | B2 * | 5/2024 | Zhu | G06N 3/045 |
| 2010/0161300 | A1 * | 6/2010 | Yeten | G06F 30/20 703/10 |
| 2013/0096898 | A1 * | 4/2013 | Usadi | G06N 20/00 703/10 |
| 2020/0183047 | A1 * | 6/2020 | Denli | G06N 3/094 |
| 2021/0304891 | A1 * | 9/2021 | Kozloski | G06N 3/096 |
| 2022/0018981 | A1 | 1/2022 | Wang | |
| 2022/0335185 | A1 | 10/2022 | Kristensen et al. | |
| 2023/0186617 | A1 * | 6/2023 | Karras | G06N 3/094 706/25 |
| 2023/0408723 | A1 | 12/2023 | Chatar et al. | |
| 2024/0003245 | A1 * | 1/2024 | Havre | E21B 43/00 |
| 2024/0303925 | A1 * | 9/2024 | Zhu | G06N 3/047 |
| 2025/0164656 | A1 * | 5/2025 | Shumaker | G06N 20/00 |
| 2025/0240439 | A1 * | 7/2025 | Ibrahim | H04N 19/70 |
| 2025/0290394 | A1 * | 9/2025 | Alfayez | G01V 20/00 |
| 2025/0315656 | A1 * | 10/2025 | Ma | G01V 3/18 |

OTHER PUBLICATIONS

Gunderson G. “Sampling: Two Basic Algorithms.” [online blog] Sep 1, 2019. Retrieved from the Internet on Dec. 11, 2025, 6 pages. <URL: https://gregorygundersen.com/blog/2019/09/01/sampling/>.

Karras et al. “Elucidating the design space of diffusion-based generative models.” Advances in Neural Information Processing Systems. Dec. 6, 2022;35:26565-77; 13 pages.

Karras et al. “Elucidating the design space of diffusion-based generative models.” Advances in Neural Information Processing Systems. arXiv preprint.2206.00364v2. Oct. 11, 2022; 47 pages.

PCT Application No. PCT/US2025/056106, International Search Report and Written Opinion mailed Feb. 3, 2026, Applicant Terra AI, Inc.; 15 pages.

PCT Application No. PCT/US2026/015479, Invitation to Pay Additional Fees mailed Apr. 7, 2026, Applicant Terra AI, Inc.; 2 pages.

* cited by examiner

Sensors 121
Network 140
Model generation compute device 100
Processor 102
Memory 104
Input data 106
Multi-mode embedding encoder 108
Random noises 110
Generative network 112
3D geological models 114
Final 3D geological models 116
Surrogate model 118
Collected 3D geological models 120

400

Receiving input data (1) associated with a geological area and (2) including a plurality of types of input data 402

↓

Inputting the input data into a multi-mode embedding encoder configured to generate an output (1) based on the input data, (2) representing a compressed version of the input data and (3) that is in a format compatible with a generative network 404

↓

Generating first random noise 406

↓

Inputting the output and the first random noise to the generative network to generate a first geological model 408

↓

Generating second random noise different than the first random noise 410

↓

Inputting the second random noise, the output, and the first geological model to the generative network to generate a second geological model different than the first geological model 412

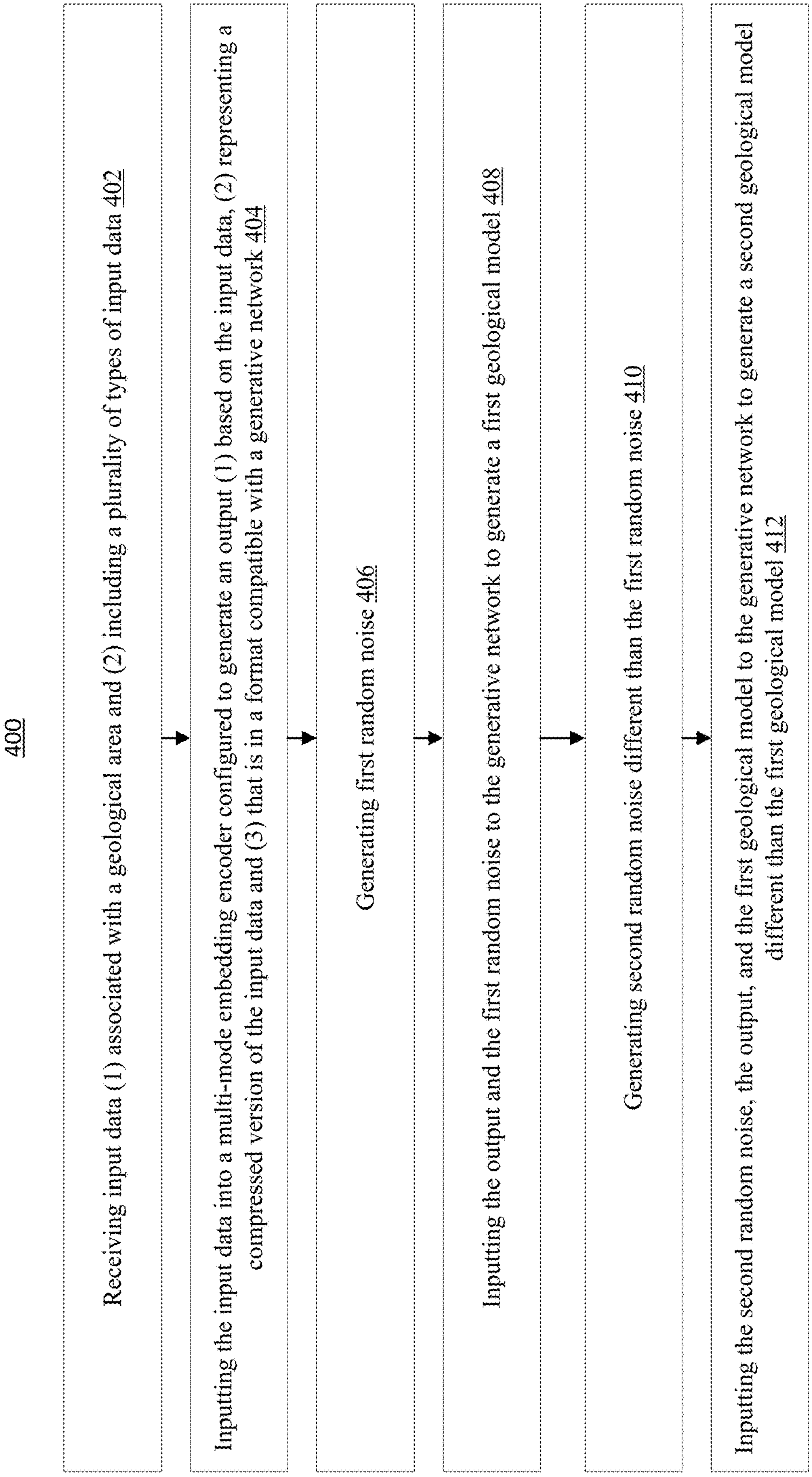

Figure 5:
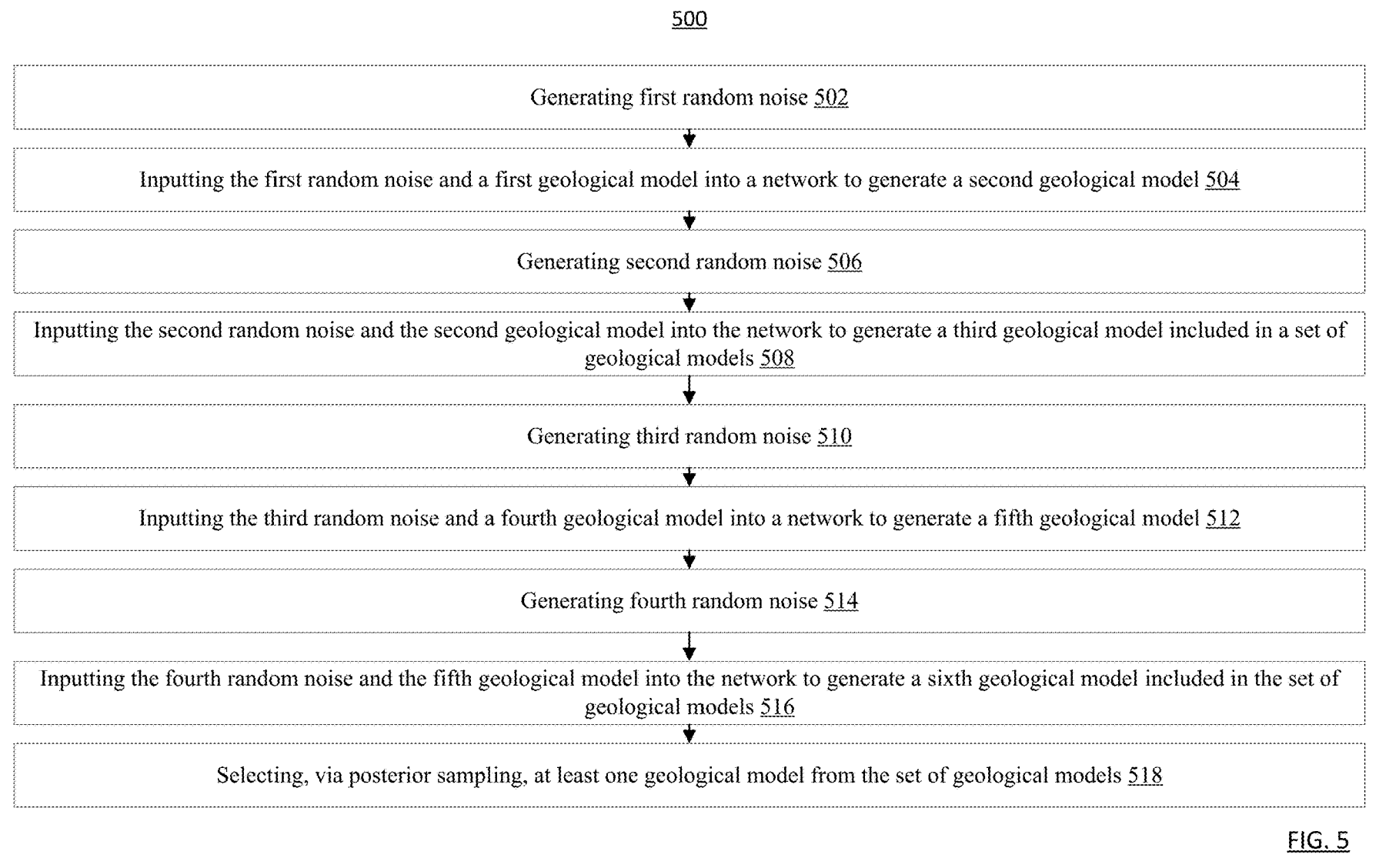

Generating first random noise 502

↓

Inputting the first random noise and a first geological model into a network to generate a second geological model 504

↓

Generating second random noise 506

↓

Inputting the second random noise and the second geological model into the network to generate a third geological model included in a set of geological models 508

↓

Generating third random noise 510

↓

Inputting the third random noise and a fourth geological model into a network to generate a fifth geological model 512

↓

Generating fourth random noise 514

↓

Inputting the fourth random noise and the fifth geological model into the network to generate a sixth geological model included in the set of geological models 516

↓

Selecting, via posterior sampling, at least one geological model from the set of geological models 518

Receive input data (1) associated with a geological area and (2) including a plurality of types of input data 602

↓

Input the input data into a multi-mode embedding encoder configured to generate an output (1) based on the input data, (2) representing a compressed version of the input data and (3) that is in a format compatible with a generative network 604

↓

Input the output and a random noise to the generative network to generate a first version of a geological model, the first version of the geological model being in a latent space 606

↓

Input the first version of the geological model into a surrogate model to generate a surrogate model output associated with the plurality of types of input data 608

↓

Compare the surrogate model output to the input data to determine a likelihood that the surrogate model output will occur 610

↓

Classify the geological model based on the likelihood that the surrogate model output will occur 612

↓

Decode, via the generative network, the first version of the geological model to generate a second version of the geological model, the second version of the geological model not being in the latent space 614

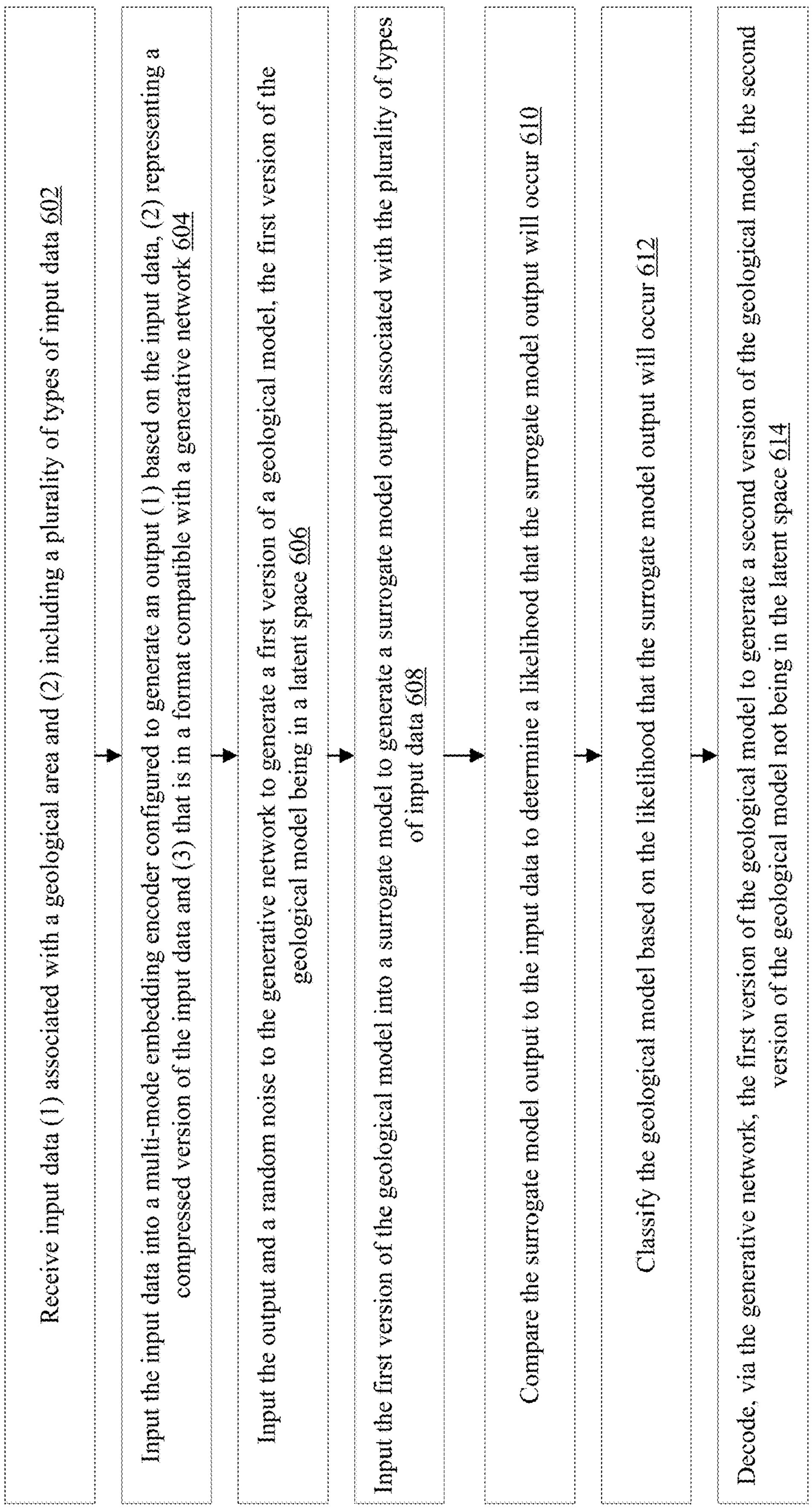

FIG. 6

SYSTEMS AND METHODS FOR PROBABILISTIC GEOLOGY INVERSION WITH NEURAL GENERATIVE MODELS

CROSS REFERENCE TO RELATED APPLICATION

This application claims priority to U.S. Patent Application No. 63/726,424, filed Nov. 29, 2024 and titled "SYSTEMS AND METHODS FOR PROBABILISTIC GEOLOGY INVERSION WITH NEURAL GENERATIVE MODELS," the contents of which are incorporated by reference herein in its entirety.

FIELD

One or more embodiments are related to systems and methods for probabilistic geology inversion with neural generative models.

BACKGROUND

Understanding the subsurface of a geological area can be valuable for a variety of reasons, such as identifying natural resources or assessing geological structures. Some known methods for determining subsurface characteristics, however, are imprecise, incomplete, and computationally expensive. Therefore, finding more accurate, comprehensive, and computationally efficient ways to analyze what lies beneath the surface can be desirable.

SUMMARY

In an embodiment, input data (1) associated with a geological area and (2) including a plurality of types is received. The input data is input into a multi-mode embedding encoder configured to generate an output (1) based on the input data, (2) representing a compressed version of the input data and (3) that is in a format compatible with a generative network. First random noise is generated. The output and the first random noise are input to the generative network to generate a first geological model. Second random noise different than the first random noise is generated. The second random noise, the output, and the first geological model is input to the generative network to generate a second geological model different than the first geological model.

BRIEF DESCRIPTION OF THE DRAWINGS

FIG. 4 illustrates a flowchart of a method to generate multiple geological models, according to an embodiment.

FIG. 5 illustrates a flowchart of a method to generate geological models, according to an embodiment.

FIG. 6 illustrates a flowchart of a method to generate a geological model in a latent space, according to an embodiment.

DETAILED DESCRIPTION

Figure 1A:
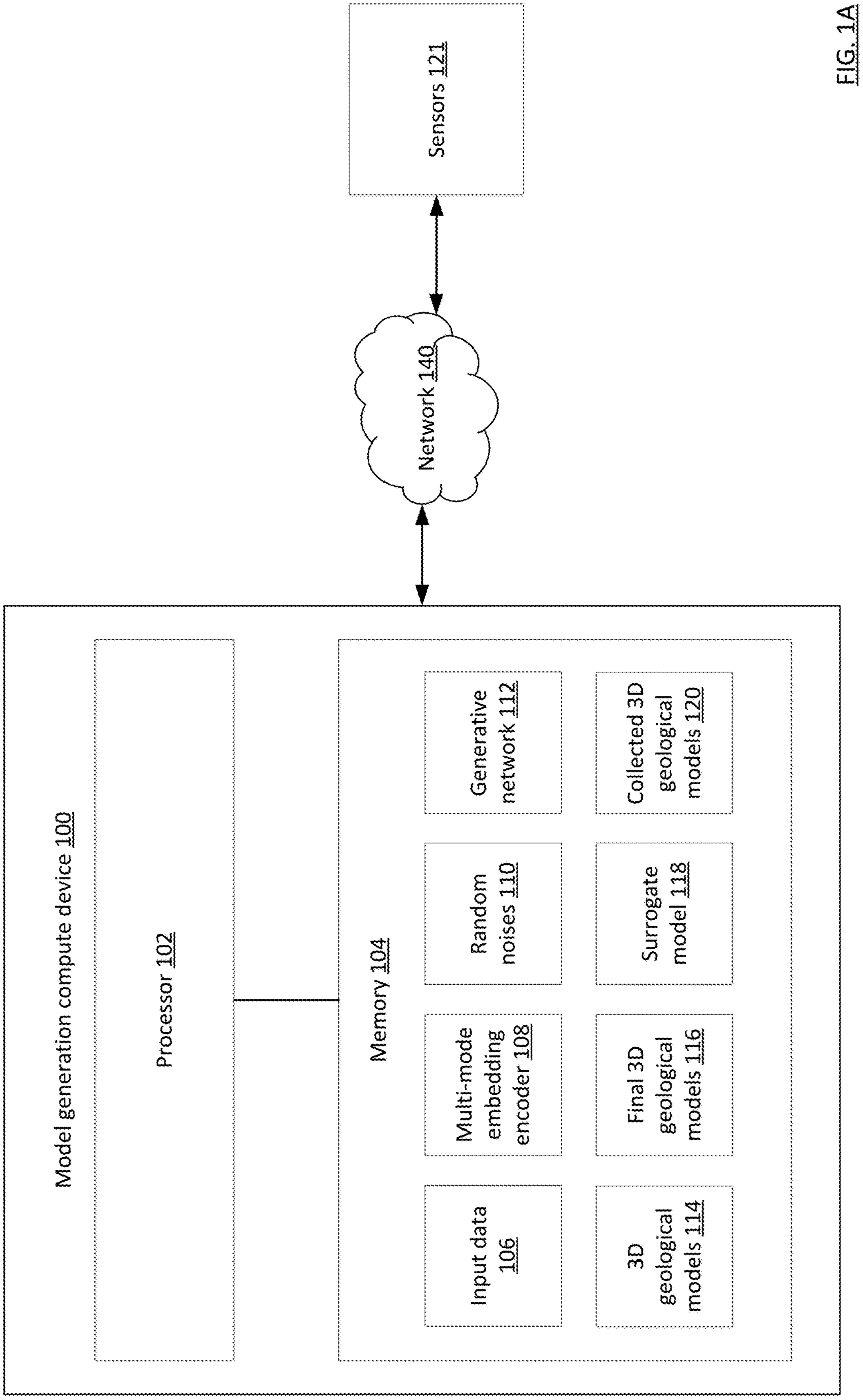
FIG. 1A illustrates a system block diagram to generate three-dimensional (3D) geological models based on input data collected by sensors, according to an embodiment.

In some implementations, a "three-dimensional (3D) geological model" refers to a digital representation of the Earth's subsurface that integrates geological, geophysical, and/or geochemical data to visualize and analyze the 3D arrangement of geological features.

In subsurface resource exploration and development, various types of measurements can be taken. Some examples include measurements of the gravitational and magnetic field strength over a target area, measurements of seismic response, measurements of electromagnetic conductivity and/or electrical resistivity, measurements from soil and/or groundwater samples, and/or ground penetrating radar (GPR) measurements. Properties of the rocks below the surface can be estimated using the observed signals and an inversion process. In general, however, this is a degenerate problem since different arrangements of rock shapes, sizes, and properties can nonetheless produce the same signal.

Some known methods for subsurface resource exploration and development use a form of deterministic optimization with a variety of heuristic approximations to arrive at a single guess of the subsurface model that produced the observed signals. This approach has a variety of limitations, such as, for example:

1. Providing no measure of uncertainty: The degeneracy of the inversion problem means that a given survey or set of surveys will be unlikely (if not impossible) to provide an accurate or perfect model of the true reality underground. Some known methods that produce a single "guess" do not meaningfully capture that several, potentially very different models, may be equally likely. This can lead to undesirable exploration decisions and undesirable reservoir designs targeting resources that are not accurately modeled.
2. Limited realism: Reliance on heuristics can lead to over-smoothing and other physically unrealistic model features. This limits the utility of the inversion models in exploration, understanding, and decision making.
3. Limited interpretability: Some known inversion models only produce estimates of subsurface parameters for which they directly have data. For example, an inversion based solely on gravity data may only produce estimates of rock density without providing further information about rock type, mineral composition, etc.

Techniques described herein use generative modeling to produce ensembles of highly realistic geological models that match the observed signals (sometimes referred to herein as "input data"), but otherwise vary in geologically plausible ways. By producing a wide range of possible models, techniques described herein not only produce viable estimates of the subsurface based on the observed signals, but also produce measures of the uncertainty remaining in the understanding of the subsurface given the data. For example, an ensemble generated based on gravity data may contain 3D geology models with large, moderate density anomalies as well as models with small, high density anomalies that both recreate the observed signal. Measuring the differences between models gives a quantitative measure of the uncertainty that is useful for future decision making. Techniques described herein can also produce parameterized models that define relevant parameters (e.g., rock type, mineral concentration, etc.), not just estimates of the directly observable properties for a given set of data. In some implementations, a model(s) can also be trained to invert based on an arbitrary set of inputs, not just geophysical signals, including expert knowledge and prior mapping.

In some implementations, the model(s) has two sets of networks-a multi-mode embedding encoder (sometimes referred to herein as "encoder") and a generative network. The encoder is trained to compress each signal type and combine them into a representation usable by the downstream network (e.g., the generative network). The generative network creates 3D geological models by iteratively adapting noise (e.g., generated through a random noise generator) to resemble realistic 3D geological models that match the observed signals. The produced 3D geological models are further adapted and/or filtered to match the observed signal with an optional, follow-on sampling process. In this sampling process, each model's return signal can be simulated with a neural surrogate model and selectively accepted or rejected with a posterior sampling routine.

Some techniques described herein relate to the formulation and application of generative modeling to geological inversion. For example:

- Multi-Physics Encoder Training: Some techniques relate to an encoder that is suitable for a wide variety of exploration and subsurface data types by designing input data representations and encoder architectures for each data type individually, as well as a method to integrate the signals. Because the data is not always representable as an "image like" input, in some implementations, vision-based methods are not directly applied. Some techniques also relate to training methods for the model(s).
- Distributional Metrics: Probabilistic evaluation metrics beyond known loss metrics can be used for network training so the output ensemble more accurately represents the appropriate posterior distribution compared to known techniques.
- Posterior Sampling: Posterior sampling can be applied to provide desirable fit with data that can be difficult to condition to (e.g., drill core data). For some modes, geophysical signatures can be simulated in large quantities. To enable this to occur at a faster speed, neural surrogate modeling can be used in the loop.
- Procedural training data generation: To create the training data for training the generative network, a procedural geology generation routine that creates 3D geological models using physical and kinematic simulation of the subsurface can be applied. Neural surrogate models can also be used to generate the signals associated with each of these models at scale.

FIG. 1A illustrates a system block diagram to generate 3D geological models based on input data at least partially collected by sensors, according to an embodiment. FIG. 1A includes model generation compute device 100 and sensors 121, communicatively coupled to one another via network 140.

The network 140 can be any suitable communications network for transferring data, operating over public and/or private networks. For example, the network 140 can include a private network, a Virtual Private Network (VPN), a Multiprotocol Label Switching (MPLS) circuit, the Internet, an intranet, a local area network (LAN), a wide area network (WAN), a metropolitan area network (MAN), a worldwide interoperability for microwave access network (WiMAX®), an optical fiber (or fiber optic)-based network, a Bluetooth® network, a virtual network, and/or any combination thereof. In some instances, the network 140 can be a wireless network such as, for example, a Wi-Fi or wireless local area network ("WLAN"), a wireless wide area network ("WWAN"), and/or a cellular network. In other instances, the network 140 can be a wired network such as, for example, an Ethernet network, a digital subscription line ("DSL") network, a broadband network, and/or a fiber-optic network. In some instances, the network can use Application Programming Interfaces (APIs) and/or data interchange formats, (e.g., Representational State Transfer (REST), JavaScript Object Notation (JSON), Extensible Markup Language (XML), Simple Object Access Protocol (SOAP), and/or Java Message Service (JMS). The communications sent via the network 140 can be encrypted or unencrypted. In some instances, the network 140 can include multiple networks or subnetworks operatively coupled to one another by, for example, network bridges, routers, switches, gateways and/or the like (not shown).

Sensors 121 can include one or more sensors. In some implementations, sensors 121 include sensors that can be used for subsurface resource exploration and development, such as to gather relevant data that can be used to predict what resources are located where underneath a given location or any other subsurface layout. Examples of sensors 121 include seismic sensors, magnetometers, electromagnetic induction sensors, electrical resistivity tomography sensors, downhole cameras, temperature and pressure sensors, gas analyzers, soil gas sensors, acoustic emission sensors, satellite sensors, and/or the like.

Model generation compute device 100 can be any type of compute device, such as a server, desktop, laptop, tablet, phone, internet-of-things device, and/or the like. Model generation compute device 100 includes processor 102 communicatively coupled to memory 104 (e.g., via a system bus).

The processor 102 can be, for example, a hardware based integrated circuit (IC) or any other suitable processing device configured to run and/or execute a set of instructions or code. For example, the processor 102 can be a general purpose processor, a central processing unit (CPU), an accelerated processing unit (APU), an application specific integrated circuit (ASIC), a field programmable gate array (FPGA), a programmable logic array (PLA), a complex programmable logic device (CPLD), a programmable logic controller (PLC) and/or the like. The processor 102 can be operatively coupled to the memory 104 through a system bus (for example, address bus, data bus and/or control bus).

The memory 104 can be, for example, a random-access memory (RAM), a memory buffer, a hard drive, a read-only memory (ROM), an erasable programmable read-only memory (EPROM), and/or the like. In some instances, the memory 104 can store, for example, one or more software programs and/or code that can include instructions to cause the processor 102 to perform one or more processes, functions, and/or the like. In some embodiments, the memory 104 can include extendable storage units that can be added and used incrementally. In some implementations, the memory 104 can be a portable memory (e.g., a flash drive, a portable hard disk, and/or the like) that can be operatively coupled to the processor 102. In some instances, the memory 104 can be remotely operatively coupled with a compute device (not shown). For example, a remote database device can serve as a memory and be operatively coupled to the compute device.

Data captured by sensors 121 can be sent to and received at model generation compute device 100 via network 140 and stored in memory 104 as part of input data 106. Input data 106 can include data that is relevant (e.g., will or can be used) to generate 3D geological models associated with a geological area. Examples of types of input data 106 include geophysics data (e.g., seismic data, electromagnetic data, magnetic data, gravity data, etc.) associated with the geological area, geospatial data (e.g., visual or hyperspectral data from a satellite or aircraft) associated with the geological area, drill core data (e.g., collected from rock samples extracted from the ground) associated with the geological area, geological data (e.g., rock and/or soil data, stratigraphic data, gas emissions, etc.) associated with the geological area, a geological map (e.g., indicating what rocks are where, where observed and/or inferred faults are located, etc.) associated with the geological area, and/or the like. In some implementations, input data 106 can include data collected by sensors 121 and not from other sources. In some implementations, input data 106 can include data collected by sensors 121 as well as other data sources (e.g., not shown in FIG. 1).

Memory 104 can include (e.g., store) a multi-mode embedding encoder 108 that can be executed by processor 102. In some implementations, a "multi-mode embedding encoder" refers to a model that captures the relevant features from multiple different types of data and encodes those different types of data into a shared/common representation space. Multi-mode embedding encoder 108 can be, for example, an encoder configured to process and integrate multiple different data types into a unified representation (e.g., embedding). Multi-mode embedding encoder 108 can be configured to receive the input data 106 as input and generate an output representing a compressed version of input data 106. Generating an output representing a compressed version of input data 106 can include, for example, applying dimensionality reduction to input data 106, performing feature extraction to input data 106, and/or the like.

In some implementations, multi-mode embedding encoder 108 is trained using a super resolution training technique. In some implementations, multi-mode embedding encoder 108 is trained using input data including different data types and target data representing compressed versions of the input data. Multi-mode embedding encoder 108 can be trained at model generation compute device 100 and/or trained at a compute device not shown in FIG. 1A (and later received at model generation compute device 100).

In some implementations, multi-mode embedding encoder 108 includes multiple encoders. For example, if input data 106 includes X types of input data (where X is a positive integer), multi-mode embedding encoder 108 can include (1) X encoders that are each configured to receive a different type of input data and (2) an additional encoder configured to receive the outputs from the X encoders and generate the output representing a compressed version of input data 106. The output representing the compressed version of input data 106 output by multi-mode embedding encoder 108 can be a lower-dimension, dense vector representation of input data 106 (e.g., which can reduce computational complexity, increase memory efficiency, reduce noises, prevent overfitting, and/or the like). Additional details related to multi-mode embedding encoder 108 are discussed with reference to FIG. 2.

Memory 104 can also include (e.g., store) random noises 110. Random noises 110 can be generated using any technique. For example, a pseudo-random number generator can be used to generate random numbers that are then used to generate the random noises 110. In some implementations, each random noise from random noises 110 is different from remaining random noises from random noises 110.

Memory 104 can also include (e.g., store) generative network 112 that can be executed by processor 102. In some implementations, generative network 112 can be a diffusion network, a flow-matching network, a score-based transport modeling (SBTM) network, and/or the like. Generative network 112 can be configured to generate 3D geological models 114, where a subset of models from 3D geological models 114 are considered final 3D geological models 116. Specifically, at a first iteration, generative network 112 receives the output from multi-mode embedding encoder 108 and a first random nose from random noises 110 to generate a first 3D geological model that is included in 3D geological models 114. Thereafter, the first 3D geological model, the output from multi-mode embedding encoder 108, and a second random noise from random noises 110 is input into generative network 112 to generate a second 3D geological model that is included in 3D geological models 114. This process can be repeated any number of times until a first predetermined set of stopping criteria is met, each iteration (1) replacing the 3D geological model just input into generative network 112 with the 3D geological model just output by generative network 112 (based on the 3D geological model that was just input and is now being replaced) as the new input for the generative network 112 in that iteration, (2) inputting a different/unique random noise from random noises 110, and (3) inputting the output from multi-mode embedding encoder 108. Similarly stated, for each iteration after the first iteration, a subsequent 3D geological model is output by generative network 112 in response to receiving as input the preceding 3D geological model, a random noise from random noises 110 (where a different random noise is used each iteration), and the output from multi-mode embedding encoder. Once the first predetermined set of stopping criteria are met, the 3D geological model generated at that final iteration represents a first final 3D geological model included in final 3D geological models 116. The aforementioned process to generate the first final 3D geological model can then be performed multiple times to generate additional final 3D geological models until a second predetermined set of stopping criteria is met (each time using a different random noise from random noises 110), thereby resulting in final 3D geological models 116. Accordingly, a nested loop is performed, where each iteration at an outer loop of the nested loop produces a final 3D geological model by repeatedly running an inner loop of the nested loop to generate multiple 3D geological models until that final 3D geological model is eventually produced.

The first or second predetermined set of stopping criteria can be, for example, a predetermined number of iterations, a noise level or quality of a generated 3D geological model within a predetermined acceptable range, converging at a loss function, human approval, a time limit, and/or the like.

In some implementations, each 3D geological model included in 3D geological models 114 is generated using a different noise from random noises 110. In some implementations, where final 3D geological models 116 includes Y final 3D geological models, final 3D geological models 116 represent the Y 3D geological models from 3D geological models 114 with the least noise and/or highest quality. In some implementations, for a given iterative process to generate a final 3D geological model from final 3D geological models 116, the 3D geological models generated progressively get less noisy and/or achieve higher quality at each iteration; therefore, for a given iterative process, a prior 3D geological model generated during that iterative process will be noisier/of lower quality than the subsequent 3D geological model generated based on that prior 3D geological model. In some implementations, 3D geological models from 3D geological models 114 that are not part of final 3D geological models 116 are deleted to save space at memory 104.

Memory 104 can also include (e.g., store) surrogate model 118. In some implementations, a surrogate model mimics the behavior of a simulation model while being computationally cheaper to evaluate. Said similarly, surrogate models are approximations of simulation models, where the surrogate models can be faster and less computationally complex than the simulation models by, for example, using more parallel operation. Examples of surrogate model approaches that can be used include response surfaces, kriging, radial basis function, neural networks, space mapping, random forest, and/or the like. Surrogate model 118 can receive final 3D geological models 116 as input and generate surrogate model outputs. For example, surrogate model 118 evaluates a set of points (e.g., design points, simulation runs) at final 3D geological models 116, builds the surrogate model output by approximating the behavior of the set of points, and optionally performs refinement of the surrogate model output (e.g., by exploring different configurations). The surrogate model outputs can represent, for each final 3D geological model in final 3D geological models 116, values for the input data types included in input data 106 at that final 3D geological model. For example, if input data 106 includes geophysics data, geospatial data, drill core data, geological data, and a geological map, the surrogate model output for a given final 3D geological model in final 3D geological models 116 can represent a geophysics data value(s) associated with that given final 3D geological model, a geospatial data value(s) associated with that given final 3D geological model, a drill core data value(s) associated with that given final 3D geological model, a geological data value(s) associated with that given final 3D geological model, and/or geological map associated with that given final 3D geological model.

Figure 1B:
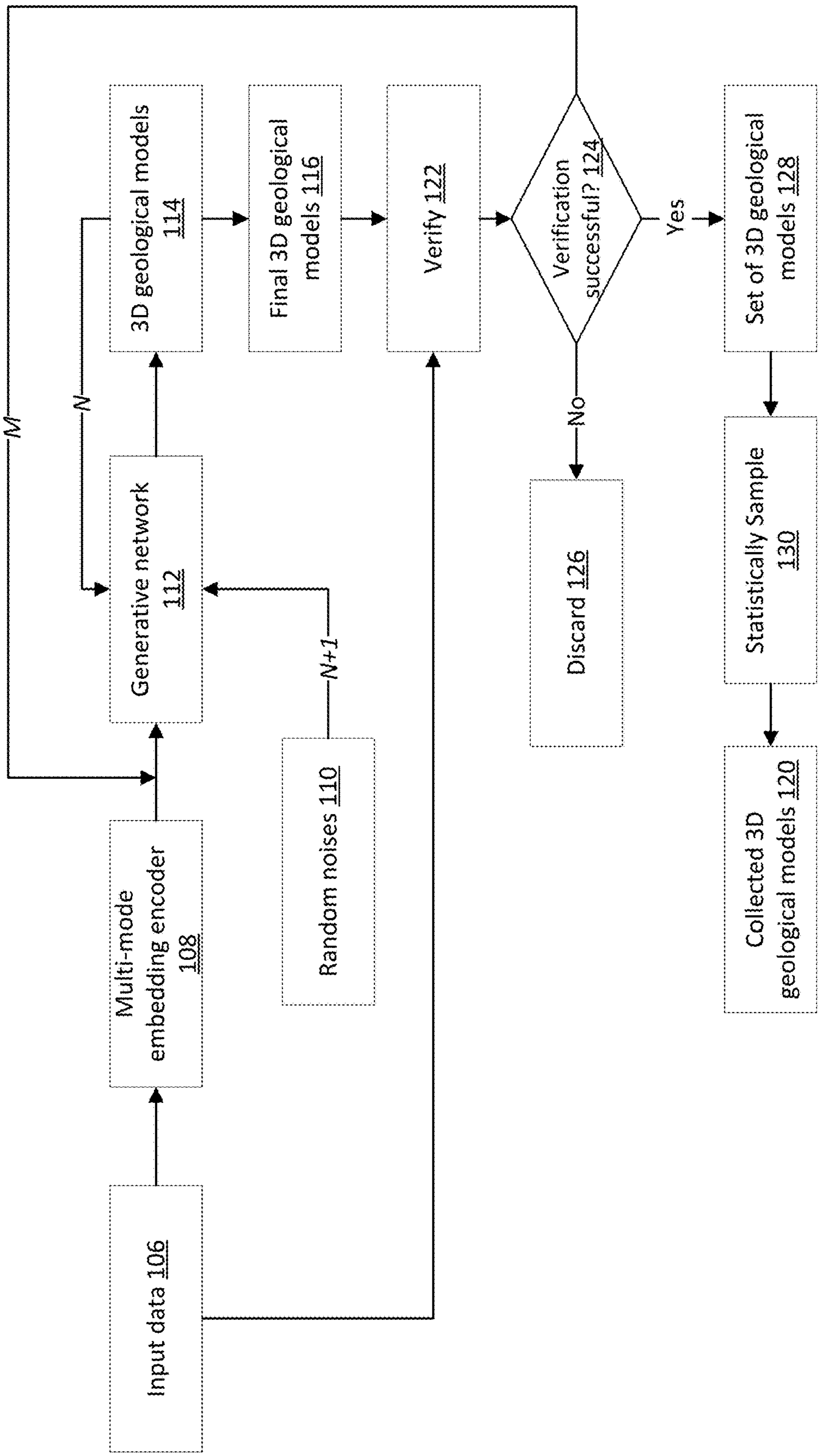
FIG. 1B illustrates a flow process to generate collected 3D geological models, according to an embodiment.

For each final 3D geological model included in final 3D geological models 116, a likelihood (e.g., confidence value) can be determined that that final 3D geological model will and/or can occur in real life based on the surrogate model output generated based on that final 3D geological model and input data 106 (e.g., but not that final 3D geological model itself, which can reduce processing burden compared to known techniques); if the likelihood (e.g., confidence value) is within a predetermined acceptable range, that final 3D geological model is included in a set of 3D geological models (e.g., set of 3D geological models 128 at FIG. 1B). Similarly stated, the surrogate model 118 can verify that each final 3D geological model included in the final 3D geological models 116 is sufficiently plausible based on the input data 106.

Thereafter, posterior sampling can be applied to the set of 3D geological models to generate collected 3D geological models 120. For example, posterior sampling can be applied such that collected 3D geological models 120 occur with a frequency proportional to the likelihood of collected 3D geological models 120 in a target distribution (e.g., a Bayesian posterior distribution). For example, more 3D geological models that have high likelihoods (e.g., confidence scores) will be included in the collected 3D geological models 120 and a lower number of 3D geological models that have medium and/or lower likelihoods (e.g., confidence scores) will be included in the collected 3D geological models 120 (e.g., along a normal distribution).

Collected 3D geological models 120 can represent potential and/or likely geological models for a given geological area. Said differently, collected 3D geological models 120 can represent what a subsurface is likely to be for a given geological area based on data associated with that given geological area (e.g., input data 106). In some implementations, each 3D geological model from collected 3D geological models 120 can be associated with (e.g., assigned) a probability value indicating a likelihood that a subsurface matches that 3D geological model (e.g., the probability calculated by comparing the surrogate model output with input data 106

In some implementations, one or more actions can occur in response to generating collected 3D geological models 120. For example, one or more collected 3D geological models from collected 3D geological models 120 can be displayed (e.g., at model generation compute device 100 and/or a compute device not shown in FIG. 1A). As another example, a resource exploration plan (e.g., for mining resources or extracting oil and gas) can be generated based on collected 3D geological models 120. The resource exploration plan can, for example, output (e.g., display) and/or provide a recommendation such as where to explore for resources, how to explore, when to explore, what types of resources are likely or unlikely, environmental risks to avoid and/or be cautious of, what equipment can be used, and/or the like. In response to generating the recommendation, one or more aspects of the recommendation can be implemented by a human and/or by a compute device/machine without human intervention (e.g., autonomous drilling, sampling, and/or resource assessment). As another example, an environmental study (e.g., contamination assessment, earthquake risk, landslide or flood risk, etc.) can be generated based on collected 3D geological models 120. As another example, if collected 3D geological models 120 is for a first geological area and model generation compute device 100 (and/or a different compute not shown in FIG. 1A) has access to collected 3D geological models for a second geological area adjacent to the first geological area, the two sets of collected 3D geological models can be combined to represent the first and second geological areas together.

FIG. 1B illustrates a flow process to generate collected 3D geological models, according to an embodiment. Input data 106 is input into multi-mode embedding encoder 108 to generate an output. Thereafter, an inner loop occurs N times (or, alternatively, until another criterion is met), where at a first iteration of the inner loop, the output and a random noise from random noises 110 (e.g., but not a 3D geological model) is input into generative network 112 to generate a 3D geological model included in 3D geological models 114. Thereafter, at each subsequent iteration of the inner loop, the same process is repeated using the output from multi-mode embedding encoder 108, a different random noise from random noises 110, and the 3D geological model generated during the preceding iteration. Upon completing the Nth iteration (or, alternatively, when another criterion is met), the 3D geological model generated from the Nth iteration is saved as part of final 3D geological models 116 and verified at 122. Verifying can include, for example, generating surrogate model output (e.g., using surrogate model 118) based on that final 3D geological model and determining a probability that final 3D geological model can/will occur in real life based on input data 106. Determining if the verification is successful at 124 can include determining whether the probability determined at 112 is within a predetermined acceptable range, where that final 3D geological model is part of set of 3D geological models 128 if the probability is within the predetermined acceptable range and discarded (e.g., not part of set of 3D geological models 128) at 126 if the probability is not within the predetermined acceptable range. Statistical sampling of set of 3D geological models 128 can occur at 130 to generate collected 3D geological models 120. After verifying the final 3D geological model at

124, sampling at 130, and completing a first iteration of an outer loop, M additional outer loop iterations can be performed to generate an additional M final 3D geological models. In some implementations, for each outer loop iteration, N inner loop iterations is performed. In some implementations, for at least one outer loop iteration, a number of inner loop iterations different than N is performed. In some implementations, for each outer loop iteration, (1) the first inner loop iteration for that outer loop iteration inputs an output from multi-mode embedding encoder 108 and a random noise from random noises 110 into generative network 112 without inputting a 3D geological model into generative network 112 and (2) each subsequent inner loop iteration for that outer loop iteration inputs the output from multi-mode embedding encoder 108, a random noise from random noises 110, and a 3D geological model into generative network 112.

Although FIGS. 1A and 1B illustrate an example, variations can exist in other implementations. For example, in some implementations, 3D geological models 114 are generated without using input data 106 and/or multi-mode embedding encoder 108. In other words, 3D geological models and random noises can be input into generative network 112 without inputting input data 106 and/or an output from multi-mode embedding encoder 108 into generative network 112 to generate additional 3D geological models. In such a situation, the generated 3D geological models can be filtered/cut down using posterior sampling but without using a surrogate model to compare the generated 3D geological models with input data to generate collected 3D geological models 120.

Multi-mode embedding encoder 108 and generative network 112 can be trained to perform techniques described herein. For example, for each data type in input data 106, an individual encoder of a given architecture type can be trained using a form of auto-encoder training. In this task, for example, a secondary network inputs and/or ingests the output of the encoder network and the combined encoder+decoder network is trained to reconstruct the original signal/image. Because the output of the encoder network is smaller than the input data size, the encoder learns to include data in the encoded representation that are important to reconstruction (and discard data not important to reconstruction). Upon training, the decoder can be discarded and/or not used. With the encoders trained, the integrated encoder (e.g., multi-mode embedding encoder 108) is trained (e.g., using super-resolutioning, in which a decoder network is again used to train the network to create higher resolution images from lower resolution images). Once the integrated encoder is trained, the integrated network is trained by connecting the input of the generative network 112 to the output of the integrated encoder. The generative network 112 is trained to produce geological models that can have plausibly created the input data by reducing (e.g., minimizing) the difference between the generated model and the 3D model provided in training using a loss formulation. In some implementations, to validate the generative network 112 is producing samples proportionately with a true posterior distribution, the density, coverage, and vendi metrics can be tracked and, in response to a value of the density, coverage, or vendi metrics being outside a predetermined acceptable range, a remedial action can occur (e.g., retrain the generative network 112).

Although some methods, systems, apparatus and techniques are described herein as using a multi-mode embedding encoder, in some implementations, a different type of model(s) can be used, such as separate encoders with fusion layers, cross-model transformers, join training models, contrastive learning models, and/or the like. Additionally or alternatively, although some methods, systems, apparatus and techniques are described herein as using a generative network, in some implementations, a different type of model (s) can be used, such as discriminative models (e.g., convolutional neural networks, recurrent neural networks), retrieval-based models (e.g., nearest neighbor search), optimization-based models (e.g., gradient descent optimization, simulated annealing), Markov models, reinforcement learning, and/or the like.

In some implementations, the generative modeling framework described with reference to FIGS. 1A and 1B (e.g., generative network 112) can be implemented using a latent diffusion approach. Latent diffusion can refer to, for example, a variant of diffusion modeling that operates within a compressed latent space rather than directly on the full high-dimensional data (e.g., voxelized geology or geophysical grids) before compression. In some implementations, input data 106 and/or output from multi-mode embedding encoder 108 is generated, represented, and/or converted into a latent space, which represents a lower-dimensional version of input data 106 and/or the output from multi-mode embedding encoder 108. In some implementations, the latent-space version of the output from multi-mode embedding encoder 108 can be input into generative network 112 to generate a latent-space version of 3D geological models 114. A latent-space version of final 3D geological models 116 can be generated based on the latent-space version of 3D geological models 114, verifying at 122 can occur based on the latent-space version of final 3D geological models 116, set of 3D geological models 128 can be represented and/or determined in the latent space, statistically sampling at 130 can occur in the latent space using the latent-space version of 3D geological models 128, collected 3D geological models 120 can be represented and/or determined in the latent space, and/or the like. Said similarly, once data (e.g., input data 106 and/or output from multi-mode embedding encoder 108) has been converted into the latent space, one or more subsequent steps (e.g., generating 3D geological models 114, generating final 3D geological models 116, verifying at 122, discarding at 126, determining verification success at 124, generating set of 3D geological models 128, statistically sampling at 130, and/or generating collected 3D geological models 120) can occur in the latent space. In some implementations, after converting data (e.g., collected 3D geological models 120) into a latent space, that data is converted from the latent-space to a higher dimensional, non-latent space (e.g., for display, for analysis using a larger dataset, etc.). For example, statistically sampling can occur at 130 in the latent space to generate a latent-space version of collected 3D geological models 120, then the latent-space version of collected 3D geological models 120 can be converted out of the latent space (e.g., for further, more in-depth analysis or visualization).

While some implementations described herein are related to diffusion-based generative modeling (e.g., by generative network 112), other deep generative approaches that model probability distributions through stochastic or deterministic dynamics-such as flow-matching, score-based transport, or related repeated (e.g., continuous, periodic, sporadic) normalizing flow techniques-can be used interchangeably within the same framework. Said similarly, generative network 112 can be any suitable type of network, such as a diffusion-based network, a network configured to perform flow-matching, a network to perform score-based transport, or a network to perform other related repeated normalizing flow techniques. Similar to diffusion, other networks can define a transformation between a tractable base distribution and the complex geological or geophysical model distribution, and can be conditioned through posterior sampling against observed data and forward simulations. Such networks can provide benefits in efficiency, stability, and/or sampling speed depending on the context.

Figure 2:
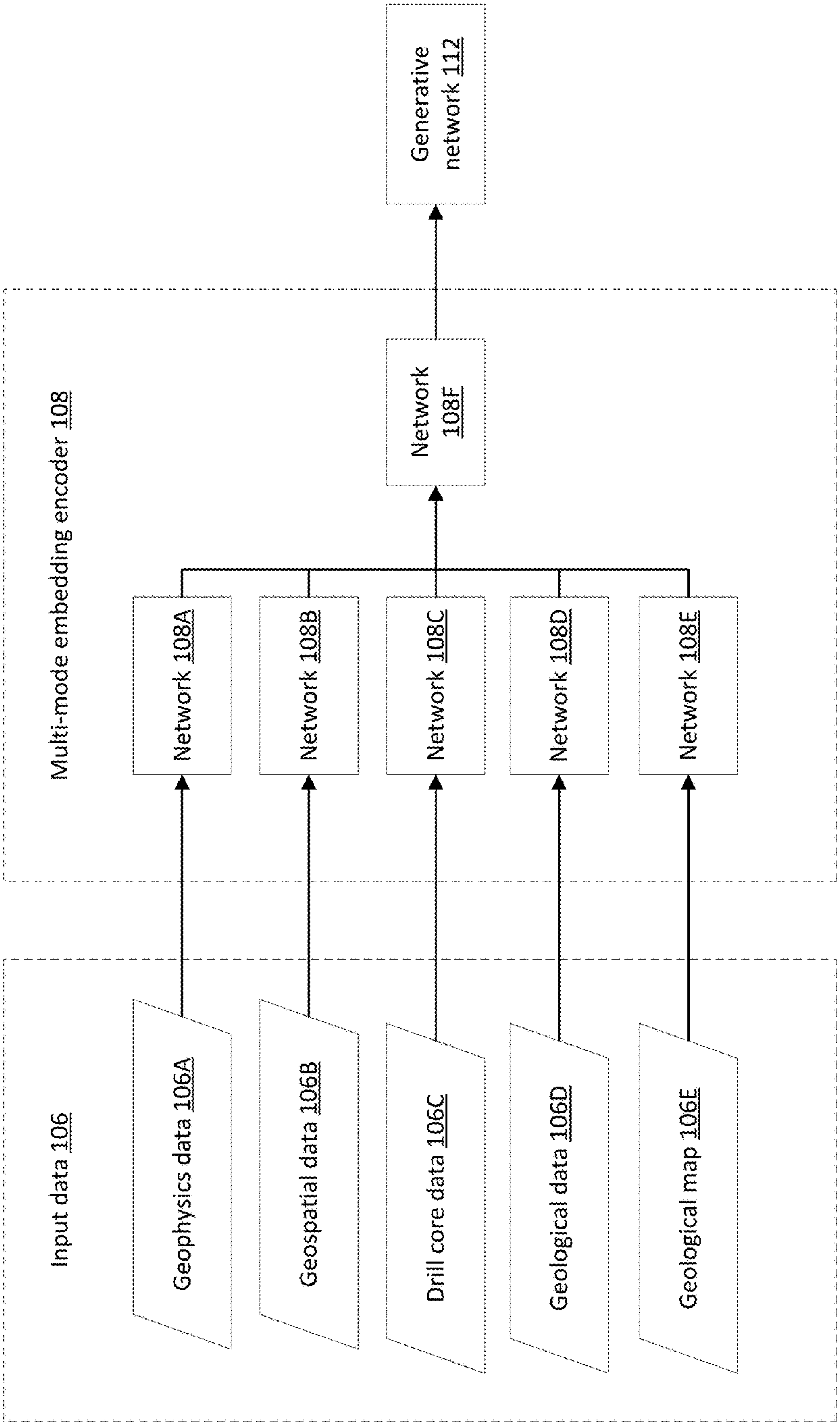
FIG. 2 illustrates a flow of input data from a multi-mode embedding encoder to a generative network, according to an embodiment.

FIG. 2 illustrates a data flow of input data from a multi-mode embedding encoder to a generative network, according to an embodiment. Input data 106 can include multiple different types of data, such as geophysics data 106A, geospatial data 106B, drill core data 106C, geological data 106D, and geological map 106E. While not shown in FIG. 2, other types of data can also be included. For each of these different types of data, data being that type can be input into a different network. For example, geophysics data 106A can be input into network 108A, geospatial data 106B can be input into network 108B, drill core data 106C can be input into network 108C, geological data 106D can be input into network 108D, and geological map 106E can be input into network 108E.

Networks 108A, 108B, 108C, 108D, and 108E can each be a different type (e.g., architecture or structure) of network, each be the same type of network, or include a combination of some networks that are the same type and other networks that are not the same type. In some implementations, for example, network 108A can be a residual convolutional net (ResNet) and/or trained via a masked autoencoder. In some implementations, for example, network 108B can be a vision transformer or masked autoencoder. In some implementations, for example, network 108C can be a 3D position encoder and transformer, or an autoencoder. In some implementations, for example, network 108D and 108E can be a convolutional and/or vision-transformer-based model. In some implementations, networks 108A, 108B, 108C, 108D, and/or 108E can be any other suitable type of network, encoder, and/or machine learning model.

Networks 108A, 108B, 108C, 108D, and 108E can be trained using any suitable training technique. For example, if network 108A, 108B, 108C, 108D, and/or 108E is an encoder(s), the encoder(s) can be trained using a decoder(s) so that the encoder(s) learns to eventually generate a compressed version of input data the encoder(s) receives using without using the decoder(s). In some implementations, networks 108A, 108B, 108C, 108D, and/or 108E are trained using training data. The training data can include, for example, real data collected from a real geological area and/or synthetic data generated by augmenting the real data or other synthetic data. By using separate networks and training each network particularly for the data type that network is configured to receive, the networks can be trained to produce compressed versions of input data that is more accurate, more compressed, more complete, not omitting important information, and/or the like.

Networks 108A, 108B, 108C, 108D, and 108E can receive geophysics data 106A, geospatial data 106B, drill core data 106C, geological data 106D, and geological map 106E, respectively, and generate outputs representing compressed and/or encoded versions of geophysics data 106A, geospatial data 106B, drill core data 106C, geological data 106D, and geological map 106E, respectively. Thereafter, the compressed and/or encoded versions of geophysics data 106A, geospatial data 106B, drill core data 106C, geological data 106D, and geological map 106E can be input into network 108F, where network 108F is configured to generate an output (e.g., a single output) based on the compressed and/or encoded versions of geophysics data 106A, geospatial data 106B, drill core data 106C, geological data 106D, and geological map 106E. For example, the output by network 108F can be a combination of the compressed and/or encoded versions of geophysics data 106A, geospatial data 106B, drill core data 106C, geological data 106D, and geological map 106E. As another example, the output by network 108F can be a further compressed and/or encoded version of the compressed and/or encoded versions of geophysics data 106A, geospatial data 106B, drill core data 106C, geological data 106D, and geological map 106E. Network 108F can be, for example, a multi-head attention network (e.g., instead of a single-head attention network), where each attention head can focus on different outputs by networks 108A, 108B, 108C, 108D, and 108E to capture more complex representations of the data input into network 108F and operate in parallel (and thus be quicker and more computationally efficient).

Output from network 108F can then be input into generative network 112. Generative network 112 can be, for example, a diffusion transformer 3D (DiT3D) trained using a generative reconstruction loss schedule.

Figure 3:
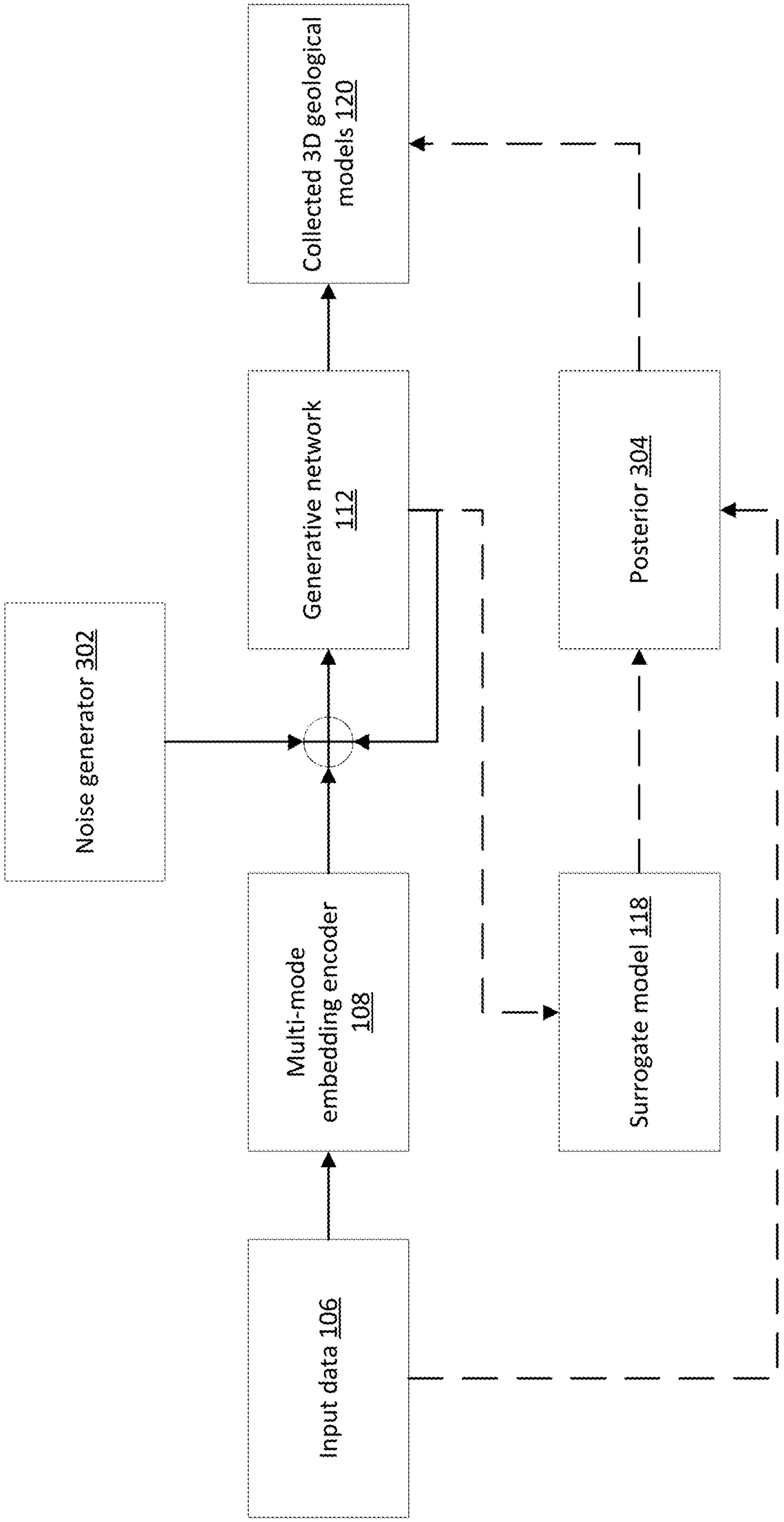
FIG. 3 illustrates a flowchart of generating 3D geological models, according to an embodiment.

FIG. 3 illustrates a flow to generate 3D geological models, according to an embodiment. Input data 106 is input into multi-mode embedding encoder 108. Noise generator 302 generates a random noise, and the random noise and output from multi-mode embedding encoder 108 (which in some implementations can be represented in the latent space) are input to generative network 112 to generate a 3D geological model. This process of generating 3D geological models is repeated, each iteration using a different random noise generated by noise generator 302 and a subsequently generated 3D geological model in place of the previously generated 3D geological model as input to generative network 112. As generative network 112 generates final 3D geological models 116 (not shown in FIG. 3), those final 3D geological models 116 are input to surrogate model 118 to generate surrogate model outputs, those surrogate model outputs are analyzed based on input data 106 to select surrogate model outputs that are probable based on input data 106, and posterior sampling is performed at 304 to sample collected 3D geological models 120 based on the surrogate model outputs determined to be probable. Additionally or alternatively, if multi-mode embedding encoder 108 generates a latent-space version of input data 106, that latent-space version of input data 106 can be analyzed by (e.g., input into) (1) generative network 112 to generate collected 3D geological models 120 and/or (2) surrogate model 118 to generate surrogate model outputs. Surrogate model outputs in the latent space can be analyzed (e.g., in the latent space) based on input data 106 (e.g., a latent-space version of input data 106) to select surrogate model outputs that are probable based on input data 106. Additionally or alternatively, posterior sampling can performed at 304 in the latent space to sample a latent-space version of collected 3D geological models 120 based on the latent-space version of surrogate model outputs determined to be probable.

FIG. 4 illustrates a flowchart of a method 400 to generate multiple geological models, according to an embodiment. In some implementations, method 400 includes code stored in a memory (e.g., memory 104 of FIG. 1A) and executed and/or performed by a processor (e.g., processor 102 of FIG. 1A).

At 402, input data (e.g., input data 106) (1) associated with a geological area and (2) including a plurality of types of input data (e.g., geophysics data 106A, geospatial data 106B, drill core data 106C, geological data 106D, geological map 106E) is received.

At 404, the input data is input into a multi-mode embedding encoder (e.g., multi-mode embedding encoder 108) configured to generate an output (1) based on the input data, (2) representing a compressed and/or encoded version of the input data and (3) that is in a format compatible with a generative network (e.g., generative network 112). In some implementations, 404 occurs automatically (e.g., without human intervention) in response to completing 402.

At 406, first random noise (e.g., from random noises 110) is generated. In some implementations, 406 occurs automatically (e.g., without human intervention) in response to completing 402 and/or 404.

At 408, the output and the first random noise are input to the generative network to generate a first geological model (e.g., included in 3D geological models 114 but not final 3D geological models 116). In some implementations, 408 occurs automatically (e.g., without human intervention) in response to completing 406.

At 410, second random noise (e.g., from random noises 110) different than the first random noise is generated. In some implementations, 410 occurs automatically (e.g., without human intervention) in response to completing 402, 404, 406, and/or 408.

At 412, the second random noise, the output, and the first geological model are input to the generative network to generate a second geological model (e.g., included in 3D geological models 114 and final 3D geological models 116) different than the first geological model. In some implementations, 412 occurs automatically (e.g., without human intervention) in response to completing 410.

In some implementations of method 400, inputting the output and the first random noise to the generative network to generate the first geological model at 408 includes inputting the output, the first random noise, and a third geological model to the generative network to generate the first geological model. For example, the third geological model may have been generated before the first geological model. In other words, if the second geological model represents the final 3D geological model for a given outer loop iteration, the first geological model represents the 3D geological model generated just prior to the final 3D geological model for that given outer loop iteration by inputting the output, the first random noise, and the third geological model to the generative network.

Some implementations of method 400 further include generating third random noise (e.g., from random noises 110). Some implementations of method 400 further include inputting the output and the third random noise to the generative network to generate a third geological model (e.g., included in 3D geological models 114 but not final 3D geological models 116). Some implementations of method 400 further include generating a fourth random noise (e.g., from random noises 110). Some implementations of method 400 further include inputting the fourth random noise, the output, and the third geological model to the generative network to generate a fourth geological model (e.g., included in 3D geological models 114 and final 3D geological models 116) different than the third geological model. Some implementations of method 400 further include inputting the second geological model and not the first geological model into a surrogate model (e.g., surrogate model 118) to generate a first surrogate model output associated with the plurality of types of input data. Some implementations of method 400 further include comparing the first surrogate model output to the input data to determine a first likelihood that the first surrogate model output will occur. Some implementations of method 400 further include, in response to the first likelihood being within a predetermined acceptable range, including the second geological model in a set of geological models (e.g., set of 3D geological models 128). Some implementations of method 400 further include, in response to the first likelihood not being within the predetermined acceptable range, refraining from including the second geological model in the set of geological models (e.g., set of 3D geological models 128). Some implementations of method 400 further include inputting the fourth geological model and the not the third geological model into the surrogate model to generate a second surrogate model output associated with the plurality of types of input data. Some implementations of method 400 further include comparing the second surrogate model output to the input data to determine a second likelihood that the second surrogate model output will occur. Some implementations of method 400 further include, in response to the second likelihood being within the predetermined acceptable range, including the fourth geological model in the set of geological models. Some implementations of method 400 further include, in response to the second likelihood not being within the predetermined acceptable range, refraining from including the fourth geological model in the set of geological models, where the first geological model and the third geological model are not included in the set of geological models. Some implementations of method 400 further include selecting, via posterior sampling, at least one geological model (e.g., collected 3D geological models 120) from the set of geological models.

In some implementations of method 400, the plurality of types of input data includes at least one of geophysics data (e.g., geophysics data 106A) associated with the geological area, geospatial data (e.g., geospatial data 106B) associated with the geological area, drill core data (e.g., drill core data 106C) associated with the geological area, geological data (e.g., geological data 106D) associated with the geological area, or a geological map (e.g., geological map 106E) associated with the geological area.

In some implementations of method 400, the multi-mode embedding encoder includes a first plurality of networks (e.g., networks 108A, 108B, 108C, 108D, 108E) and a second network (e.g., network 108F), and inputting the input data into the multi-mode embedding encoder at 404 includes inputting the input data into the first plurality of networks to generate a plurality of intermediate outputs and inputting the plurality of intermediate outputs into the second network to generate the output. In some implementations of method 400, each network from the first plurality of networks receives a type of input data from the plurality of types of input data different than remaining networks from the first plurality of networks. In some implementations of method 400, the first plurality of networks includes a first network being a first network type and a second network being a second network type different than the first network type.

In some implementations of method 400, the first geological model. This can, for example, save memory (e.g., at memory 104).

FIG. 5 illustrates a flowchart of a method 500 to generate geological models, according to an embodiment. In some implementations, method 500 includes code stored in a memory (e.g., memory 104 of FIG. 1A) and executed and/or performed by a processor (e.g., processor 102 of FIG. 1A).

At 502, first random noise (e.g., from random noises 110) is generated.

At 504, the first random noise and a first geological model (e.g., included in 3D geological models 114 but not final 3D geological models 116) are input into a network (e.g., generative network 112) to generate a second geological model (e.g., included in 3D geological models 114 but not final 3D geological models 116). In some implementations, 504 occurs automatically (e.g., without human intervention) in response to completing 502.

At 506, second random noise (e.g., from random noises 110) is generated. In some implementations, 506 occurs automatically (e.g., without human intervention) in response to completing 502 and/or 504.

At 508, the second random noise and the second geological model are input into the network to generate a third geological model (e.g., included in 3D geological models 114 and/or final 3D geological models 116) included in a set of geological models (e.g., set of 3D geological models 128). In some implementations, 508 occurs automatically (e.g., without human intervention) in response to completing 506.

At 510, third random noise (e.g., from random noises 110) is generated. In some implementations, 510 occurs automatically (e.g., without human intervention) in response to completing 502, 504, 506, and/or 508.

At 512, the third random noise and a fourth geological model (e.g., included in 3D geological models 114 but not final 3D geological models 116) are input into the network to generate a fifth geological model (e.g., included in 3D geological models 114 but not final 3D geological models 116). In some implementations, 512 occurs automatically (e.g., without human intervention) in response to completing 510.

At 514, fourth random noise (e.g., from random noises 110) is generated. In some implementations, 514 occurs automatically (e.g., without human intervention) in response to completing 502, 504, 506, 508, 510, and/or 512.

At 516, the fourth random noise and the fifth geological model are input into the network to generate a sixth geological model (e.g., included in 3D geological models 114 and/or final 3D geological models 116) included in the set of geological models. In some implementations, 516 occurs automatically (e.g., without human intervention) in response to completing 514.

At 518, at least one geological model (e.g., collected 3D geological models 120) from the set of geological models is selected via posterior sampling. In some implementations, 518 occurs automatically (e.g., without human intervention) in response to completing 508 and 516.

Some implementations of method 500 further include inputting the third geological model into a surrogate model (e.g., surrogate model 118) to generate a first surrogate model output. A likelihood that the first surrogate model output will occur is determined, where the likelihood is within a predetermined acceptable range. The third geological model is included in the set of geological models in response to determining that the likelihood that the first surrogate model output will occur is within the predetermined acceptable range.

In some implementations of method 500, the second geological model is associated with a first noise level and the third geological model is associated with a second noise level that is less than the first noise level.

Some implementations of method 500 further include deleting the first geological model, the second geological model, and the fifth geological model, which can save memory space (e.g., at memory 104).

In some implementations of method 500, the network is a flow matching network. In some implementations, a flow matching network is a model that learns a vector field that maps less complex (e.g., lower dimension) noise distributions to more complex (e.g., higher dimension) data distributions.

In some implementations, method 500 is performed without using input data (e.g., input data 106). For example, at 504, 512, and 516, input data is not input into the network.

FIG. 6 illustrates a flowchart of a method 600 to generate a geological model in a latent space, according to an embodiment. In some implementations, method 600 includes code stored in a memory (e.g., memory 104 of FIG. 1A) and executed and/or performed by a processor (e.g., processor 102 of FIG. 1A).

At 602, input data (e.g., input data 106) (1) associated with a geological area and (2) including a plurality of types of input data (e.g., geophysics data 106A, geospatial data 106B, drill core data 106C, geological data 106D, geological map 106E) is received.

At 604, input data is input into a multi-mode embedding encoder (e.g., multi-mode embedding encoder 108) configured to generate an output (1) based on the input data, (2) representing a compressed version of the input data and (3) that is in a format compatible with a generative network (e.g., generative network 112). In some implementations, 604 occurs automatically (e.g., without human intervention) in response to completing 602.

At 606, the output and a random noise (e.g., from random noises 110) are input to the generative network to generate a first version of a geological model. The first version of the geological model is in a latent space. In some implementations, 606 occurs automatically (e.g., without human intervention) in response to completing 604.

At 608, the first version of the geological model is input into a surrogate model (e.g., surrogate model 118) to generate a surrogate model output associated with the plurality of types of input data. In some implementations, 608 occurs automatically (e.g., without human intervention) in response to completing 606.

At 610, the surrogate model output is compared to the input data to determine a likelihood that the surrogate model output will occur. In some implementations, 610 occurs automatically (e.g., without human intervention) in response to completing 608.

At 612, the geological model is classified based on the likelihood that the surrogate model output will occur. In some implementations, 612 occurs automatically (e.g., without human intervention) in response to completing 610.

At 614, the first version of the geological model is decoded, via the generative network, to generate a second version of the geological model. The second version of the geological model is not in the latent space. In some implementations, 614 occurs automatically (e.g., without human intervention) in response to completing 612.

In some implementations of method 600, the random noise is a first random noise, the geological model is a first geological model, and the surrogate model output is a first surrogate model output. Some implementations of method 600 further include inputting the output and a second random noise to the generative network to generate a first version of a second geological model. The first version of the second geological model is in the latent space. Some implementations of method 600 further include inputting the first version of the geological model into the surrogate model to generate a second surrogate model output associated with the plurality of types of input data. Some implementations of method 600 further include comparing the second surrogate model output to the input data to determine a likelihood that the second surrogate model output will occur. Some implementations of method 600 further include classifying the geological model based on the likelihood that the second surrogate model output will occur. Some implementations of method 600 further include decoding, via the generative network, the first version of the second geological model to generate a second version of the second geological model, the second version of the second geological model not being in the latent space.

Some implementations of method 600 further include predicting a value for a metric (e.g., porosity, mineral composition, density, thickness, etc.) associated with the geological area based on the geological model.

It should be understood that the disclosed embodiments are not intended to be exhaustive, and functional, logical, operational, organizational, structural and/or topological modifications may be made without departing from the scope of the disclosure. As such, all examples and/or embodiments are deemed to be non-limiting throughout this disclosure.

All definitions, as defined and used herein, should be understood to control over dictionary definitions, definitions in documents incorporated by reference, and/or ordinary meanings of the defined terms.

Examples of computer code include, but are not limited to, micro-code or micro-instructions, machine instructions, such as produced by a compiler, code used to produce a web service, and files containing higher-level instructions that are executed by a computer using an interpreter. For example, embodiments can be implemented using Python, Java, Javascript, C++, and/or other programming languages and development tools. Additional examples of computer code include, but are not limited to, control signals, encrypted code, and compressed code.

The drawings primarily are for illustrative purposes and are not intended to limit the scope of the subject matter described herein. The drawings are not necessarily to scale; in some instances, various aspects of the subject matter disclosed herein can be shown exaggerated or enlarged in the drawings to facilitate an understanding of different features. In the drawings, like reference characters generally refer to like features (e.g., functionally similar and/or structurally similar elements).

The acts performed as part of a disclosed method(s) can be ordered in any suitable way. Accordingly, embodiments can be constructed in which processes or steps are executed in an order different than illustrated, which can include performing some steps or processes simultaneously, even though shown as sequential acts in illustrative embodiments. Put differently, it is to be understood that such features may not necessarily be limited to a particular order of execution, but rather, any number of threads, processes, services, servers, and/or the like that may execute serially, asynchronously, concurrently, in parallel, simultaneously, synchronously, and/or the like in a manner consistent with the disclosure. As such, some of these features may be mutually contradictory, in that they cannot be simultaneously present in a single embodiment. Similarly, some features are applicable to one aspect of the innovations, and inapplicable to others.

Where a range of values is provided, it is understood that each intervening value, to the tenth of the unit of the lower limit unless the context clearly dictates otherwise, between the upper and lower limit of that range and any other stated or intervening value in that stated range is encompassed within the disclosure. That the upper and lower limits of these smaller ranges can independently be included in the smaller ranges is also encompassed within the disclosure, subject to any specifically excluded limit in the stated range. Where the stated range includes one or both of the limits, ranges excluding either or both of those included limits are also included in the disclosure.

The phrase "and/or," as used herein in the specification and in the embodiments, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements can optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the embodiments, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the embodiments, "consisting of," will refer to the inclusion of exactly one element of a number or list of elements. In general, the term "or" as used herein shall only be interpreted as indicating exclusive alternatives (i.e., "one or the other but not both") when preceded by terms of exclusivity, such as "either," "one of," "only one of," or "exactly one of." "Consisting essentially of," when used in the embodiments, shall have its ordinary meaning as used in the field of patent law.

As used herein in the specification and in the embodiments, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements can optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the embodiments, as well as in the specification above, all transitional phrases such as "comprising," "including," "carrying," "having," "containing." "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

Some embodiments described herein relate to a computer storage product with a non-transitory computer-readable medium (also can be referred to as a non-transitory processor-readable medium) having instructions or computer code thereon for performing various computer-implemented operations. The computer-readable medium (or processor-readable medium) is non-transitory in the sense that it does not include transitory propagating signals per se (e.g., a propagating electromagnetic wave carrying information on a transmission medium such as space or a cable). The media and computer code (also can be referred to as code) can be those designed and constructed for the specific purpose or purposes. Examples of non-transitory computer-readable media include, but are not limited to, magnetic storage media such as hard disks, floppy disks, and magnetic tape; optical storage media such as Compact Disc/Digital Video Discs (CD/DVDs), Compact Disc-Read Only Memories (CD-ROMs), and holographic devices; magneto-optical storage media such as optical disks; carrier wave signal processing modules; and hardware devices that are specially configured to store and execute program code, such as Application-Specific Integrated Circuits (ASICs), Programmable Logic Devices (PLDs), Read-Only Memory (ROM) and Random-Access Memory (RAM) devices. Other embodiments described herein relate to a computer program product, which can include, for example, the instructions and/or computer code discussed herein.

Some embodiments and/or methods described herein can be performed by software (executed on hardware), hardware, or a combination thereof. Hardware modules may include, for example, a processor, a field programmable gate array (FPGA), and/or an application specific integrated circuit (ASIC). Software modules (executed on hardware) can include instructions stored in a memory that is operably coupled to a processor, and can be expressed in a variety of software languages (e.g., computer code), including C, C++, Java™, Ruby, Visual Basic™, and/or other object-oriented, procedural, or other programming language and development tools. Examples of computer code include, but are not limited to, micro-code or micro-instructions, machine instructions, such as produced by a compiler, code used to produce a web service, and files containing higher-level instructions that are executed by a computer using an interpreter. For example, embodiments may be implemented using imperative programming languages (e.g., C, Fortran, etc.), functional programming languages (Haskell, Erlang, etc.), logical programming languages (e.g., Prolog), object-oriented programming languages (e.g., Java, C++, etc.) or other suitable programming languages and/or development tools. Additional examples of computer code include, but are not limited to, control signals, encrypted code, and compressed code.

What is claimed is:

1. A method, comprising:

receiving input data (1) associated with a geological area and (2) including a plurality of types of input data;

inputting the input data into a multi-mode embedding encoder configured to generate an output (1) based on the input data, (2) representing a compressed version of the input data and (3) that is in a format compatible with a generative network;

generating first random noise;

inputting the output and the first random noise to the generative network to generate a first geological model;

generating second random noise different than the first random noise;

inputting the second random noise, the output, and the first geological model to the generative network to generate a second geological model different than the first geological model;

generating third random noise;

inputting the output and the third random noise to the generative network to generate a third geological model;

generating a fourth random noise;

inputting the fourth random noise, the output, and the third geological model to the generative network to generate a fourth geological model different than the third geological model;

inputting the second geological model and not the first geological model into a surrogate model to generate a first surrogate model output associated with the plurality of types of input data;

comparing the first surrogate model output to the input data to determine a first likelihood that the first surrogate model output will occur;

in response to the first likelihood being within a predetermined acceptable range, including the second geological model in a set of geological models;

in response to the first likelihood not being within the predetermined acceptable range, refraining from including the second geological model in the set of geological models;

inputting the fourth geological model and not the third geological model into the surrogate model to generate a second surrogate model output associated with the plurality of types of input data;

comparing the second surrogate model output to the input data to determine a second likelihood that the second surrogate model output will occur;

in response to the second likelihood being within the predetermined acceptable range, including the fourth geological model in the set of geological models;

in response to the second likelihood not being within the predetermined acceptable range, refraining from including the fourth geological model in the set of geological models, the first geological model and the third geological model not included in the set of geological models; and selecting, via posterior sampling, at least one geological model from the set of geological models.

2. The method of claim 1, wherein inputting the output and the first random noise to the generative network to generate the first geological model includes inputting the output, the first random noise, and a fifth geological model to the generative network to generate the first geological model.

3. The method of claim 1, wherein the plurality of types of input data includes at least one of geophysics data associated with the geological area, geospatial data associated with the geological area, drill core data associated with the geological area, geological data associated with the geological area, or a geological map associated with the geological area.

4. The method of claim 1, wherein the multi-mode embedding encoder includes a first plurality of networks and a second network, and inputting the input data into the multi-mode embedding encoder includes:

inputting the input data into the first plurality of networks to generate a plurality of intermediate outputs; and inputting the plurality of intermediate outputs into the second network to generate the output.

5. The method of claim 4, wherein each network from the first plurality of networks receives a type of input data from the plurality of types of input data different than remaining networks from the first plurality of networks.

6. The method of claim 4, wherein the first plurality of networks includes a first network being a first network type and a second network being a second network type different than the first network type.

7. The method of claim 1, further comprising:

deleting the first geological model.

8. An apparatus, comprising:

a memory; and a processor operatively coupled to the memory, the processor configured to:

receive input data (1) associated with a geological area and (2) including a plurality of types of input data;

input the input data into an encoder configured to generate an output (1) based on the input data, (2) representing a compressed version of the input data and (3) that is in a format compatible with a generative network;

generate first random noise;

input the output and the first random noise to the generative network to generate a first geological model;

generate second random noise different than the first random noise;

input the second random noise, the output, and the first geological model to the generative network to generate a second geological model different than the first geological model;

generate third random noise;

input the output and the third random noise to the generative network to generate a third geological model;

generate a fourth random noise;

input the fourth random noise, the output, and the third geological model to the generative network to generate a fourth geological model different than the third geological model;

input the second geological model and not the first geological model into a surrogate model to generate a first surrogate model output associated with the plurality of types of input data;

compare the first surrogate model output to the input data to determine a first likelihood that the first surrogate model output will occur;

in response to the first likelihood being within a predetermined acceptable range, include the second geological model in a set of geological models;

in response to the first likelihood not being within the predetermined acceptable range, refrain from including the second geological model in the set of geological models;

input the fourth geological model and not the third geological model into the surrogate model to generate a second surrogate model output associated with the plurality of types of input data;

compare the second surrogate model output to the input data to determine a second likelihood that the second surrogate model output will occur;

in response to the second likelihood being within the predetermined acceptable range, include the fourth geological model in the set of geological models;

in response to the second likelihood not being within the predetermined acceptable range, refrain from including the fourth geological model in the set of geological models, the first geological model and the third geological model not included in the set of geological models; and select, via posterior sampling, at least one geological model from the set of geological models.

9. The apparatus of claim 8, wherein inputting the output and the first random noise to the generative network to generate the first geological model includes inputting the output, the first random noise, and a fifth geological model to the generative network to generate the first geological model.

10. The apparatus of claim 8, wherein the plurality of types of input data includes at least one of geophysics data associated with the geological area, geospatial data associated with the geological area, drill core data associated with the geological area, geological data associated with the geological area, or a geological map associated with the geological area.

11. The apparatus of claim 8, wherein the encoder includes a first plurality of networks and a second network, and inputting the input data into the encoder includes:

inputting the input data into the first plurality of networks to generate a plurality of intermediate outputs; and inputting the plurality of intermediate outputs into the second network to generate the output.

12. The apparatus of claim 11, wherein each network from the first plurality of networks receives a type of input data from the plurality of types of input data different than remaining networks from the first plurality of networks.

13. The apparatus of claim 11, wherein the first plurality of networks includes a first network being a first network type and a second network being a second network type different than the first network type.

14. A non-transitory, processor-readable medium storing instructions that, when executed by one or more processors, cause the one or more processors to:

receive input data (1) associated with a geological area and (2) including a plurality of types of input data;

input the input data into a multi-mode embedding encoder configured to generate an output based on the input data;

generate first random noise;

input the output and the first random noise to a generative network to generate a first geological model;

generate second random noise different than the first random noise;

input the second random noise, the output, and the first geological model to the generative network to generate a second geological model different than the first geological model;

generate third random noise;

input the output and the third random noise to the generative network to generate a third geological model;

generate a fourth random noise;

input the fourth random noise, the output, and the third geological model to the generative network to generate a fourth geological model different than the third geological model;

input the second geological model and not the first geological model into a surrogate model to generate a first surrogate model output associated with the plurality of types of input data;

compare the first surrogate model output to the input data to determine a first likelihood that the first surrogate model output will occur;

in response to the first likelihood being within a predetermined acceptable range, include the second geological model in a set of geological models;

in response to the first likelihood not being within the predetermined acceptable range, refrain from including the second geological model in the set of geological models;

input the fourth geological model and not the third geological model into the surrogate model to generate a second surrogate model output associated with the plurality of types of input data;

compare the second surrogate model output to the input data to determine a second likelihood that the second surrogate model output will occur;

in response to the second likelihood being within the predetermined acceptable range, include the fourth geological model in the set of geological models;

in response to the second likelihood not being within the predetermined acceptable range, refrain from including the fourth geological model in the set of geological models, the first geological model and the third geological model not included in the set of geological models; and select, via posterior sampling, at least one geological model from the set of geological models.

15. The non-transitory, processor-readable medium of claim 14, wherein the plurality of types of input data includes at least one of geophysics data associated with the geological area, geospatial data associated with the geological area, drill core data associated with the geological area, geological data associated with the geological area, or a geological map associated with the geological area.

16. The non-transitory, processor-readable medium of claim 14, wherein the multi-mode embedding encoder includes a first plurality of networks and a second network, and the instructions to input the input data into the multi-mode embedding encoder include instructions to:

input the input data into the first plurality of networks to generate a plurality of intermediate outputs; and input the plurality of intermediate outputs into the second network to generate the output.

17. The non-transitory, processor-readable medium of claim 16, wherein each network from the first plurality of networks receives a type of input data from the plurality of types of input data different than remaining networks from the first plurality of networks.

18. The non-transitory, processor-readable medium of claim 16, wherein the first plurality of networks includes a first network being a first network type and a second network being a second network type different than the first network type.

19. The non-transitory, processor-readable medium of claim 14, wherein the plurality of types of input data includes at least three of geophysics data associated with the geological area, geospatial data associated with the geological area, drill core data associated with the geological area, geological data associated with the geological area, or a geological map associated with the geological area.

20. The non-transitory, processor-readable medium of claim 14, wherein the plurality of types of input data includes at least five of geophysics data associated with the geological area, geospatial data associated with the geological area, drill core data associated with the geological area, geological data associated with the geological area, or a geological map associated with the geological area.

* * * * *